US008589534B2

(12) United States Patent
Sakai et al.

(10) Patent No.: US 8,589,534 B2
(45) Date of Patent: Nov. 19, 2013

(54) DEVICE INFORMATION MANAGEMENT APPARATUS, DEVICE INFORMATION MANAGEMENT METHOD, AND STORAGE MEDIUM WHICH OPERATES DURING A FAILURE

(75) Inventors: Minoru Sakai, Kanagawa (JP); Yasuhiro Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 730 days.

(21) Appl. No.: 12/202,746

(22) Filed: Sep. 2, 2008

(65) Prior Publication Data
US 2009/0077231 A1 Mar. 19, 2009

(30) Foreign Application Priority Data

Sep. 13, 2007 (JP) ................................ 2007-238269
Jul. 2, 2008 (JP) ................................ 2008-173661

(51) Int. Cl.
*G06F 15/173* (2006.01)
(52) U.S. Cl.
USPC ............................ 709/224; 709/225; 709/226
(58) Field of Classification Search
None
See application file for complete search history.

(56) References Cited

U.S. PATENT DOCUMENTS

| 5,146,344 | A | * | 9/1992 | Bennett et al. | ................. | 358/296 |
| 5,155,842 | A | * | 10/1992 | Rubin | ............................... | 714/22 |
| 5,748,470 | A | * | 5/1998 | Hager et al. | ...................... | 700/82 |
| 5,814,799 | A | * | 9/1998 | Swartz et al. | .................. | 235/383 |
| 5,881,238 | A | * | 3/1999 | Aman et al. | ................... | 709/226 |
| 6,247,142 | B1 | * | 6/2001 | Wong et al. | ........................ | 714/5 |
| 6,327,591 | B1 | * | 12/2001 | Osborn et al. | ......................... | 1/1 |
| 6,404,513 | B1 | * | 6/2002 | Denker | .......................... | 358/407 |
| 6,434,165 | B1 | * | 8/2002 | Sherer et al. | ................... | 370/465 |
| 6,499,117 | B1 | * | 12/2002 | Tanaka | ............................. | 714/49 |
| 6,874,103 | B2 | * | 3/2005 | Cepulis | ........................... | 714/13 |
| 7,194,433 | B1 | * | 3/2007 | Hyakutake et al. | .............. | 705/34 |
| 7,315,893 | B2 | * | 1/2008 | Vinberg | ......................... | 709/224 |
| 7,457,879 | B2 | * | 11/2008 | Horvitz et al. | ................ | 709/227 |
| 7,624,308 | B2 | * | 11/2009 | Critchley et al. | ............... | 714/47 |
| 7,668,879 | B2 | * | 2/2010 | Vivian et al. | ................... | 709/204 |
| 7,921,224 | B2 | * | 4/2011 | Jajoo et al. | .................... | 709/235 |
| 2002/0194324 | A1 | * | 12/2002 | Guha | ............................. | 709/223 |

(Continued)

FOREIGN PATENT DOCUMENTS

| JP | 63-250746 | 10/1988 |
| JP | 6-324916 | 11/1994 |

(Continued)

OTHER PUBLICATIONS

Japanese Office Action issued Sep. 25, 2012, in Japan Patent Application No. 2008-173661.

*Primary Examiner* — Ian N Moore
*Assistant Examiner* — Dung B Huynh
(74) *Attorney, Agent, or Firm* — Oblon, Spivak, McClelland, Maier & Neustadt, L.L.P.

(57) ABSTRACT

A device information management apparatus for processing a report from a device management client during a failure of a transaction system is disclosed. The device information management apparatus includes a reception unit configured to receive the report from the device management client; a determining unit configured to determine whether to process the report based on an importance level of the report and a load (workload) level of the device information management apparatus; a processing unit configured to process the report if the determining unit determines to process the report; and a discarding unit configured to discard the report if the determining unit determines not to process the report.

14 Claims, 11 Drawing Sheets

(56) References Cited

U.S. PATENT DOCUMENTS

| | | | |
|---|---|---|---|
| 2002/0196452 A1* | 12/2002 | Komiya | 358/1.1 |
| 2003/0033554 A1* | 2/2003 | Bomfim et al. | 714/4 |
| 2003/0076532 A1* | 4/2003 | Seto | 358/1.15 |
| 2003/0081248 A1* | 5/2003 | Simpson | 358/1.15 |
| 2003/0105863 A1* | 6/2003 | Hegli et al. | 709/225 |
| 2003/0123393 A1* | 7/2003 | Feuerstraeter et al. | 370/235 |
| 2003/0142955 A1* | 7/2003 | Hashizume et al. | 386/52 |
| 2003/0145109 A1* | 7/2003 | Nakashima | 709/241 |
| 2003/0195917 A1* | 10/2003 | Horiyama et al. | 709/102 |
| 2003/0225903 A1* | 12/2003 | Lodha | 709/232 |
| 2004/0034807 A1* | 2/2004 | Rostowfske | 714/4 |
| 2004/0145973 A1* | 7/2004 | Nagashima | 368/107 |
| 2004/0199655 A1* | 10/2004 | Davies et al. | 709/231 |
| 2004/0233474 A1* | 11/2004 | Watanabe | 358/1.15 |
| 2005/0013288 A1* | 1/2005 | Hong et al. | 370/352 |
| 2005/0018242 A1* | 1/2005 | Azami | 358/1.15 |
| 2005/0050544 A1* | 3/2005 | Saito et al. | 718/103 |
| 2005/0097405 A1* | 5/2005 | Sesek et al. | 714/48 |
| 2005/0111857 A1* | 5/2005 | Negishi | 399/8 |
| 2005/0193110 A1* | 9/2005 | Dantzig et al. | 709/224 |
| 2005/0241026 A1* | 10/2005 | Esler et al. | D24/100 |
| 2005/0286483 A1* | 12/2005 | Lee et al. | 370/345 |
| 2006/0047712 A1* | 3/2006 | Shitomi et al. | 707/202 |
| 2006/0077436 A1* | 4/2006 | Zhang et al. | 358/1.15 |
| 2006/0129563 A1* | 6/2006 | Phillips et al. | 707/10 |
| 2006/0290995 A1* | 12/2006 | Tanabe et al. | 358/302 |
| 2007/0038518 A1* | 2/2007 | Yokoyama | 705/23 |
| 2007/0043784 A1* | 2/2007 | Parkinson | 707/202 |
| 2007/0091370 A1* | 4/2007 | Saito | 358/1.18 |
| 2007/0169125 A1* | 7/2007 | Qin | 718/102 |
| 2007/0208799 A1* | 9/2007 | Hughes | 709/203 |
| 2007/0220353 A1* | 9/2007 | Iura et al. | 714/39 |
| 2007/0266148 A1* | 11/2007 | Ruiz et al. | 709/224 |
| 2008/0004067 A1* | 1/2008 | Piipponen et al. | 455/550.1 |
| 2008/0030750 A1* | 2/2008 | Kato | 358/1.4 |
| 2008/0114866 A1* | 5/2008 | Round | 709/223 |
| 2008/0201470 A1* | 8/2008 | Sayama | 709/224 |
| 2009/0009340 A1* | 1/2009 | Weaver et al. | 340/573.1 |
| 2010/0238839 A1* | 9/2010 | Batteram et al. | 370/254 |

FOREIGN PATENT DOCUMENTS

| | | |
|---|---|---|
| JP | 9-6652 | 1/1997 |
| JP | 11-143829 | 5/1999 |
| JP | 2001-250008 | 9/2001 |
| JP | 2003-140986 | 5/2003 |
| JP | 2005-18372 | 1/2005 |
| JP | 3814071 | 6/2006 |
| WO | WO 2007/088575 A1 | 8/2007 |

* cited by examiner

FIG.3A

SCHEDULED REPORT

| CLIENT ID | REPORT DATE AND TIME | COUNTER INFORMATION RETRIEVAL DATE AND TIME | COUNTER INFORMATION | | |
|---|---|---|---|---|---|
| | | | COLOR | MONOCHROME | ... |
| B10384 | 2007/07/11, 13:19:26 | 2007/07/11, 12:58:31 | 28754 | 59261 | |

| PAPER JAM HISTORY INFORMATION | | | FAILURE HISTORY INFORMATION | | |
|---|---|---|---|---|---|
| S/N 1 | | | S/N 1 | | |
| DATE AND TIME | LOCATION | DETAIL | | | ... |
| | | | | | |
| ... | | | | | |
| S/N 2 | | | | | |

FIG.3B

BILLING COUNTER REPORT

| CLIENT ID | REPORT DATE AND TIME | COUNTER INFORMATION RETRIEVAL DATE AND TIME | BILLING COUNTER INFORMATION | | |
|---|---|---|---|---|---|
| | | | COLOR | MONOCHROME | ... |
| B10384 | 2007/07/11, 13:19:26 | 2007/07/11, 12:58:31 | 28754 | 59261 | |
| | | | | | |

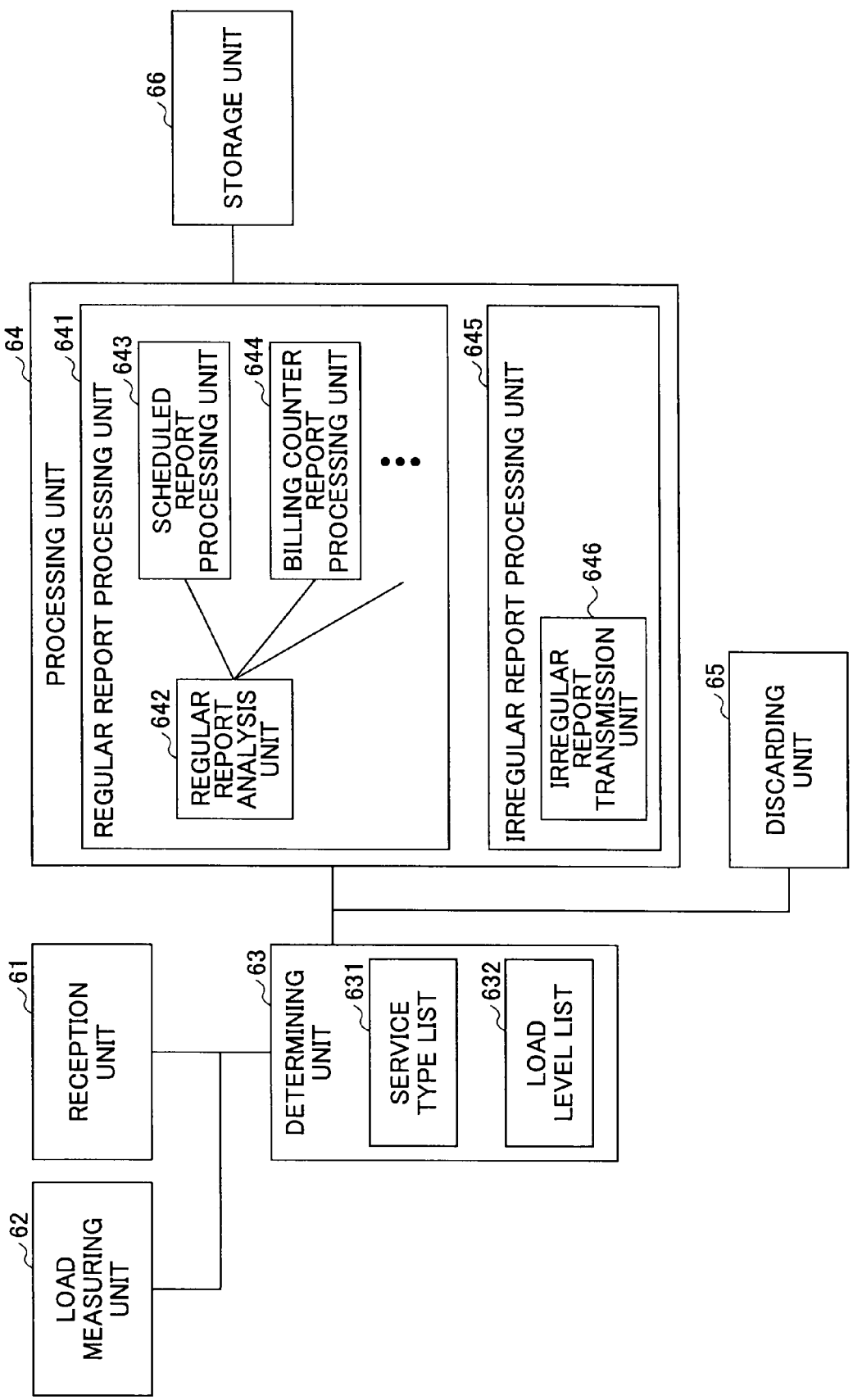

| SERVICE TYPE | IMPORTANCE LEVEL |
|---|---|
| CRITICAL FAILURE REPORT | 4 |
| SCHEDULED REPORT | 4 |
| TONER NEAR-END REPORT | 3 |
| BILLING COUNTER REPORT | 3 |
| PAPER JAM REPORT | 2 |
| COMPONENT DEGRADATION REPORT | 1 |
| ... | ... |

| SERVER LOAD RANGE | SERVER LOAD LEVEL |
|---|---|
| 0~40% | 4 |
| 41~60% | 3 |
| 61~80% | 2 |
| 81%~ | 1 |

FIG.7A

SCHEDULED REPORT

B10384, 2007/07/11,13:19:26, 2007/07/11, 12:58:31, 28754, 59261, ···,
2007/07/10,09:06:54, ···<LINEFEED>
• 
• 
•

FIG.7B

BILLING COUNTER REPORT

B10384, 2007/07/11,13:19:26, 2007/07/11, 12:58:31, 28754, 59261, ···<LINE
-FEED>
• 
• 
•

DEVICE INFORMATION MANAGEMENT APPARATUS, DEVICE INFORMATION MANAGEMENT METHOD, AND STORAGE MEDIUM WHICH OPERATES DURING A FAILURE

BACKGROUND OF THE INVENTION

1. Field of the Invention

The present invention generally relates to a device information management apparatus for collecting device information regarding operational status of devices including image processing devices such as multifunction printers (MFPs) via a network and managing the collected device information.

2. Description of the Related Art

Patent document 1 discloses a remote management system for collecting information (e.g., counter information such as the number of printed pages, failure information, and remaining-amount information of consumables such as toner) on image processing devices such as MFPs via a network, for example, the Internet.

In such a system, information including counter information and failure information of an image processing device is reported to a center by a communication device attached to the image processing device or by a communication function of the image processing device. Then, an appropriate action, e.g., dispatching a service engineer, is taken according to the importance level of the reported information.

[Patent document 1] Japanese Patent Application Publication No. 2001-250008

Remote management systems as described above have become essential to properly manage devices in customer offices. Therefore, failure of a device (server) in a remote management system may have a significant impact on the business and it is important to take appropriate measures against system failures.

Generally, measures as described below are taken to cope with failures in a remote management system.

(1) To provide multiple servers with the same function/performance so that even if a server fails, the operation can be continued with another server (cluster configuration).

(2) To provide a secondary server in a remote place so that even if a primary server fails, the operation can be continued by the secondary server (cold site or hot site).

In either case, a service being provided by a server is taken over by a backup server to continue the operation.

With the above measures, it is necessary to provide a backup server having substantially the same performance as that of the primary server. Accordingly, if a large-scale server is used as the primary server to manage a large number of devices, it is necessary to provide a backup server of equal size.

SUMMARY OF THE INVENTION

Embodiments of the present invention provide a device information management apparatus, a device information management method, and a non-transitory storage medium containing a device information management program that solve or reduce one or more problems caused by the limitations and disadvantages of the related art.

An embodiment of the present invention provides a device information management apparatus for processing a report from a device management client during a failure of a transaction system. The device information management apparatus includes a reception unit configured to receive the report from the device management client; a determining unit configured to determine whether to process the report based on an importance level of the report and a load (workload) level of the device information management apparatus; a processing unit configured to process the report if the determining unit determines to process the report; and a discarding unit configured to discard the report if the determining unit determines not to process the report.

Another embodiment of the present invention provides a method of processing a report from a device management client by a device information management apparatus during a failure of a transaction system. The method includes the steps of receiving the report from the device management client during the failure of the transaction system; determining whether to process the report based on an importance level of the report and a load level of the device information management apparatus; processing the report if it is determined to process the report; and discarding the report if it is determined not to process the report.

Still another embodiment of the present invention provides a storage medium storing program code for causing a computer to perform a method of processing a report from a device management client during a failure of a transaction system. The method includes the steps of receiving the report from the device management client during the failure of the transaction system; determining whether to process the report based on an importance level of the report and a load level of the computer; processing the report if it is determined to process the report; and discarding the report if it is determined not to process the report.

BRIEF DESCRIPTION OF THE DRAWINGS

FIGS. 3A and 3B are drawings illustrating an exemplary data structure in a DB server;

FIG. 4 is a block diagram illustrating an exemplary configuration of a device information management apparatus;

FIG. 5 is a table showing an exemplary data structure of a service type list;

FIG. 6 is a table showing an exemplary data structure of a server load list;

FIGS. 7A and 7B are drawings illustrating exemplary file formats of reports that are temporarily stored in a storage unit of a device information management apparatus;

DESCRIPTION OF THE PREFERRED EMBODIMENTS

Preferred embodiments of the present invention are described below with reference to the accompanying drawings.

<System Configuration>

Figure 1:
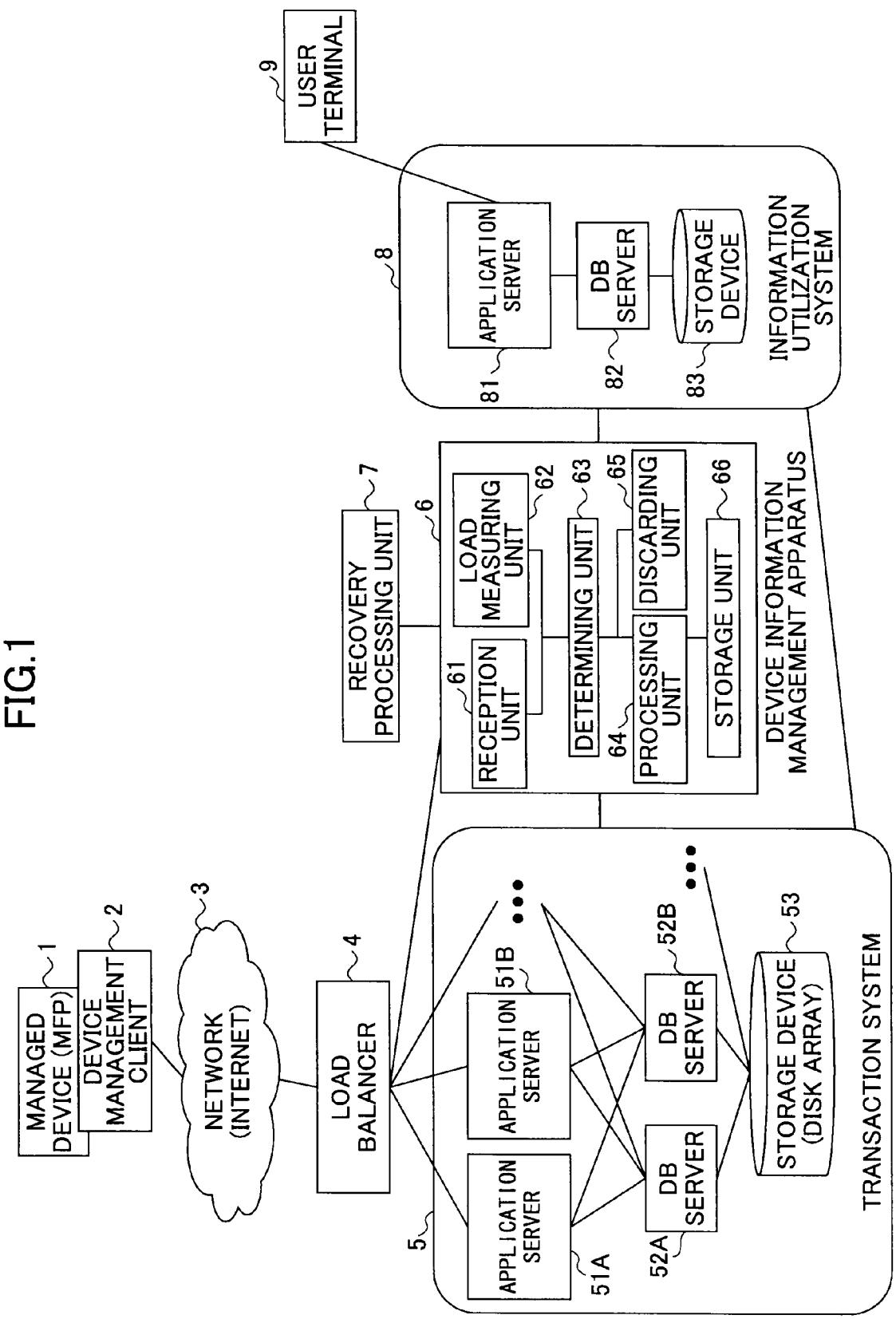
FIG. 1 is a drawing illustrating an exemplary configuration of a system according to an embodiment of the present invention.

FIG. 1 is a drawing illustrating an exemplary configuration of a system according to an embodiment of the present invention.

In FIG. 1, a device management client 2 for collecting device information is provided inside or outside of a managed device 1 such as an MFP. The device management client 2 is connected to a network 3 such as the Internet.

A load balancer 4 receives the device information collected by the device management client 2 via the network 3 and sends the device information to a transaction system 5. In the transaction system 5, application servers 51 manage the device information. Also, the device information collected by the transaction system 5 is utilized by an information utilization system 8 connected via a network to the transaction system 5. When the transaction system 5 fails, the load balancer 4 sends the device information to a device information management apparatus 6. A user terminal 9 used by a user at a service center is connected via a network to the information utilization system 8.

The transaction system 5 includes application servers 51A, 51B, ..., database (DB) servers 52A, 52B, ..., and a storage device (disk array) 53. The device information management apparatus 6 includes a reception unit 61, a load measuring unit 62, a determining unit 63, a processing unit 64, a discarding unit 65, and a storage unit 66. Also, a recovery processing unit 7 is connected to the device information management apparatus 6. The recovery processing unit 7 restores the transaction system 5 using data in the storage unit 66 during a recovery process (or after recovery).

The load balancer 4 equally distributes reports received via the network 3 from the device management client 2 to the application servers 51 for load (workload) balancing while the transaction system 5 is operating properly. During a failure of the transaction system 5, the load balancer 4 redirects the reports to the device information management apparatus 6. As a distribution algorithm during normal operations of the transaction system 5, the round robin algorithm or the fastest algorithm is preferably used. With the round robin algorithm, assuming that the transaction system 5 includes application servers 51A through 51D, reports are distributed, for example, in order of "A>B>C>D>A>B>C>D . . . ". With the fastest algorithm, each report is directed to one of the application servers 51 with the fastest response time.

When the transaction system 5 fails, the load balancer 4 redirects reports to the device information management apparatus 6. This redirection may be accomplished by either one of the following methods:

(1) The load balancer 4 is preconfigured to redirect all reports to the device information management apparatus 6 if all the application servers 51 do not respond.

(2) The load balancer 4 is manually reconfigured by an operator to redirect all reports to the device information management apparatus 6 when the transaction system 5 fails.

One problem with the method (1) is that reports may be mistakenly redirected to the device information management apparatus 6 even when responses of the application servers 51 become slow because of, for example, temporary heavy load. With the method (2), the above redirection error may not occur, but it takes time to manually reconfigure the load balancer 4.

The application servers 51 are functional units for executing business logic to provide services. The application servers 51 store regular reports received from the device management client 2 via the load balancer 4 in the storage device 53 by using the DB servers 52, and transfer irregular reports immediately to the information utilization system 8. A regular report is used to report information such as counter information on a regular basis, and an irregular report is used to report information such as failure information or remaining-amount information of consumables each time when an event occurs. Each of the application servers 51 is connected to multiple DB servers 52. The DB servers 52 connected to each application server 51 are prioritized. For example, the application server 51 first tries to access a primary DB server, and if the primary DB server does not respond, tries to access a secondary DB server.

Each of the DB servers 52 runs a database management system (DBMS) and manipulates database entities stored in the storage device 53 according to requests from the application servers 51. To prevent database access contention between the DB servers 52, a mechanism to lock, for example, a database, a table, or a record is provided. Also, synchronizing signals may be exchanged between the DB servers 52.

The device information management apparatus 6 is a functional unit to perform processing during a failure of the transaction system 5. The reception unit 61 receives reports sent from the device management client 2 via the load balancer 4. The load measuring unit 62 measures the load of the device information management apparatus 6. The determining unit 63 determines whether to process or discard a report based on the importance level of the report and the current load of the device information management apparatus 6 measured by the load measuring unit 62. Importance levels of reports are predetermined according to service types of the reports such as a critical failure report, a scheduled report, and a toner near-end report. Reports include a regular report used to report information such as counter information and an irregular report used to report information such as failure information or remaining-amount information of consumables. The processing unit 64 temporarily stores regular reports with high importance levels and transfers irregular reports with high importance levels immediately to the information utilization system 8. Reports having low importance levels and received when the load of the device information management apparatus 6 is high are discarded by the discarding unit 65 without being processed.

The recovery processing unit 7 restores regular reports temporarily stored in the storage unit 66 of the device information management apparatus 6 into the DB servers 52 during a recovery process of the transaction system 5. The function of the recovery processing unit 7 may instead be provided in the device information management apparatus 6, the load balancer 4, or the application servers 51.

The information utilization system 8 includes an application server 81, a DB server 82, and a storage device 83.

The application server 81 is a functional unit for executing business logic to provide services. The application server 81 sends irregular reports transferred from the transaction system 5 to the user terminal 9. Also, the application server 81 obtains information stored in the database of the transaction system 5 at appropriate timings and stores the obtained information in the storage device 83 under the control of the DB server 82 to be able to respond to information requests from the user terminal 9.

Figure 2:
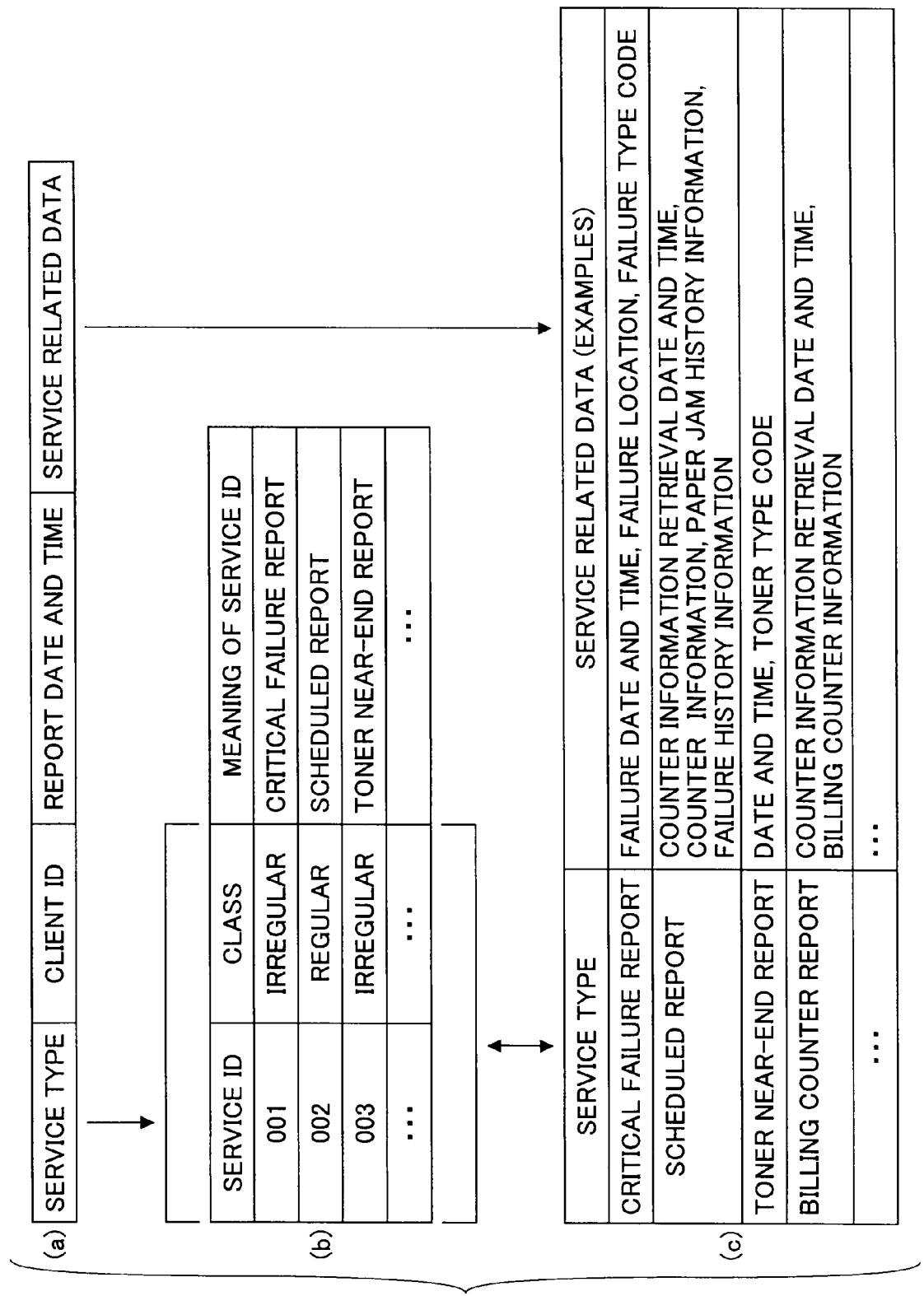
FIG. 2 is a drawing illustrating an exemplary data format of reports.

FIG. 2 (a) shows an exemplary data format of reports to be sent from the device management client 2 to the transaction system 5. Each report includes a service type, a client ID for identifying a client, report date and time indicating the date and time when the report is sent, and service related data. FIG. 2 (b) shows an exemplary structure of service types. Each service type includes a service ID for identifying a service and an identifier indicating a class. The class is either regular or irregular. FIG. 2 (c) shows examples of service related data. The contents of service related data differ depending on the service types. The service related data are text data in a comma separated values (CSV) format where items are separated by commas. The service related data may be in other data formats defined in the system.

FIGS. 3A and 3B are drawings illustrating an exemplary structure of a database of the transaction system 5. The database of the transaction system 5 includes separate tables for the respective service types of reports. FIG. 3A shows an exemplary structure of a scheduled report table in the database. Each record in the scheduled report table includes a client ID for identifying the device management client 2, report date and time indicating the date and time when the report is sent, counter information retrieval date and time indicating the date and time when information is retrieved from counters of a device (e.g., MFP), counter information indicating values of various counters, paper jam history information (when, where, and how paper jams occurred) arranged in order of occurrence, and failure history information (when and what failures occurred) arranged in order of occurrence. An MFP includes various page counters for color pages, monochrome pages, paper sizes, paper orientations, paper feed trays, and so on. Therefore, counter information is provided for the respective page counters. The paper jam history information and the failure history information include, for example, the last ten occurrences of paper jams and failures, respectively.

FIG. 3B shows an exemplary structure of a billing counter report table in the database. Each record in the billing counter report table includes a client ID for identifying the device management client 2, report date and time indicating the date and time when the report is sent, counter information retrieval date and time indicating the date and time when information is retrieved from counters of a device (e.g., MFP), and billing counter information indicating values of counters related to billing.

FIG. 4 is a block diagram illustrating an exemplary configuration of the device information management apparatus 6.

In FIG. 4, the reception unit 61 receives a report (service) from the load balancer 4 and the load measuring unit 62 measures the load of the device information management apparatus 6. The determining unit 63 determines the importance level of the report by referring to a service type list 631 where service types of reports are associated with importance levels and determines the load level of the device information management apparatus 6 by referring to a load level list 632 where load ranges of the device information management apparatus 6 are associated with load levels. The determining unit 63 sends the report to the processing unit 64 if the importance and load levels match given criteria and sends the report to the discarding unit 65 if the importance and load levels do not match the criteria.

The processing unit 64 may include a regular report processing unit 641 for processing regular reports and an irregular report processing unit 645 for processing irregular reports. The regular report processing unit 631 includes a regular report analysis unit 642 for determining types of regular reports, a scheduled report processing unit 643 for processing scheduled reports, and a billing counter report processing unit 644 for processing billing counter reports. The scheduled report processing unit 643 and the billing counter report processing unit 644 temporarily store reports in the storage unit 66. The temporarily stored reports are restored by the recovery processing unit 7 to the DB servers 52 of the transaction system 5. The reports may be stored in the storage unit 66 in a text format without using a database (without converting the reports into a database format). This makes it possible to reduce the load of the device information management apparatus 6 during a system failure and thereby to increase the number of reports that can be handled by the device information management apparatus 6.

The irregular report processing unit 645 includes an irregular report transmission unit 646 for sending irregular reports to the information utilization system 8.

FIG. 5 is a table showing an exemplary data structure of the service type list 631 retained in the determining unit 63. In the service type list 631, the importance level "4" indicates the highest importance and the importance level decreases in order of "3", "2", and "1". For example, critical failure reports and scheduled reports have the importance level "4". The highest importance level is assigned to critical failure reports because events reported by critical failure reports may have a significant impact on the business of a customer and are preferably dealt with immediately. The highest importance level is assigned to scheduled reports because they are preferably stored temporarily to prevent data loss and to be able to be restored to the transaction system 5 during a system recovery process. Lower importance levels are assigned to toner near-end reports, billing counter reports, paper jam reports, and component degradation reports because they are not very urgent and their information can be obtained later from scheduled reports.

FIG. 6 is a table showing an exemplary structure of the load level list 632 where load ranges of the device information management apparatus 6 are associated with load levels. In the load level list 632, the importance level "4" is assigned to the lowest load range between 0 and 40%, "3" to a load range between 41 and 60%, "2" to a load range between 61 and 80%, and "1" to a range of 81% or higher.

FIGS. 7A and 7B are drawings illustrating exemplary file formats of reports that are temporarily stored in the storage unit 66 of the device information management apparatus 6. The device information management apparatus 6 stores reports together with service types. Reports may be stored as text data in a CSV format. FIG. 7A shows an exemplary file format of scheduled reports. In this example, scheduled reports are not converted and are stored as text data in a CSV format. FIG. 7B shows an exemplary file format of billing counter reports. In this example, billing counter reports are not converted and are stored as text data in a CSV format.

<Operations>

Figure 8:
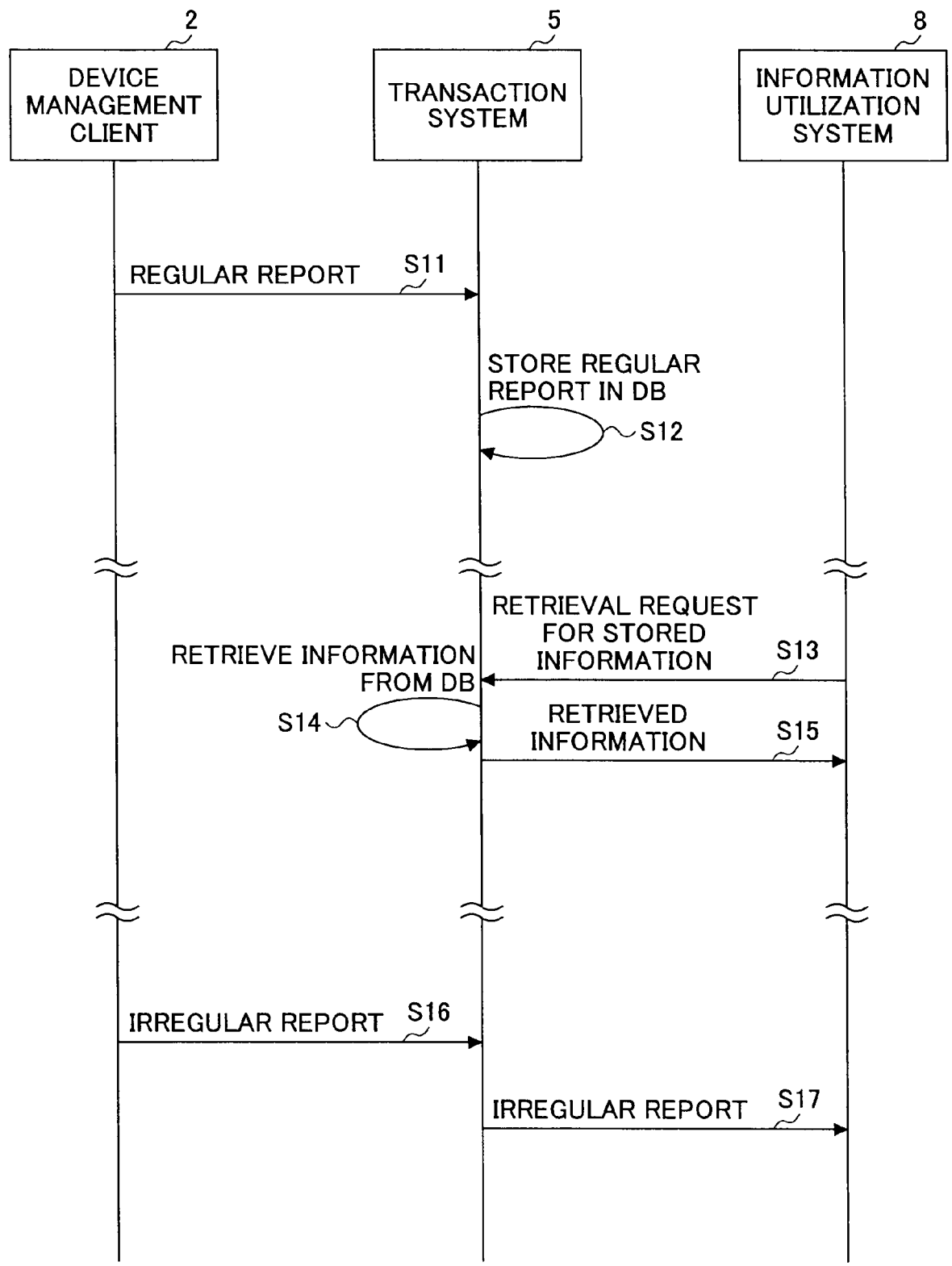
FIG. 8 is a sequence chart showing the flow of data during normal operations of a transaction system.

FIG. 8 is a sequence chart showing the flow of data during normal operations of the transaction system 5.

In FIG. 8, when a regular report is sent from the device management client 2 and is directed to one of the application servers 51 of the transaction system 5 by the load balancer 4 (step S11), the application server 51 stores the regular report in the database (step S12).

When a retrieval request for stored information is sent from the information utilization system 8 to the transaction system 5 (step S13), the transaction system 5 retrieves the requested information from the database (step S14) and sends the retrieved information to the information utilization system 8 (step S15).

Meanwhile, when an irregular report is sent from the device management client 2 and is directed to one of the application servers 51 of the transaction system 5 by the load balancer 4 (step S16), the application server 51 transfers the irregular report to the information utilization system 8 (step S17).

Figure 9:
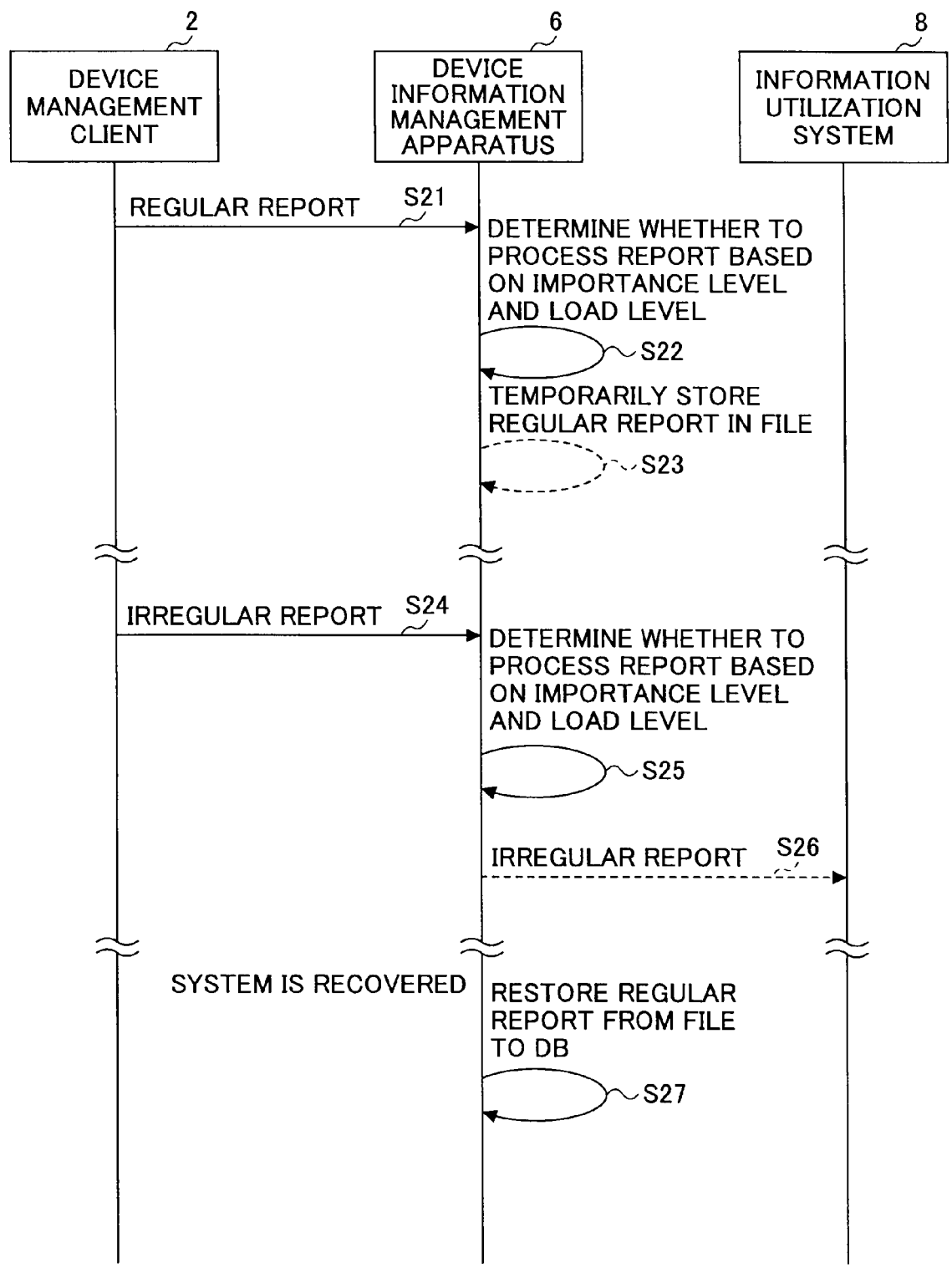
FIG. 9 is a sequence chart showing the flow of data during a failure of a transaction system.

FIG. 9 is a sequence chart showing the flow of data during a failure of the transaction system 5.

In FIG. 9, when a regular report is sent from the device management client 2 and is redirected to the device information management apparatus 6 by the load balancer 4 (step S21), the device information management apparatus 6 determines whether to process or discard the regular report based on the importance level of the report and the current load level (step S22). When determining to process the regular report, the device information management apparatus 6 temporarily stores the regular report in a file (step S23). Otherwise, the device information management apparatus 6 discards the regular report. When an irregular report is sent from the device management client 2 and is redirected to the device information management apparatus 6 by the load balancer 4 (step S24), the device information management apparatus 6 determines whether to process or discard the irregular report based on the importance level of the report and the current load level (step S25). When determining to process the irregular report, the device information management apparatus 6 transfers the irregular report to the information utilization system 8 (step S26). Otherwise, the device information management apparatus 6 discards the irregular report.

Discarding reports with low importance levels during a system failure as described above makes it possible to reduce the size of a storage device necessary to store reports. Reports may be stored in a format other than a database format. For example, storing reports in a text format makes it possible to simplify the system configuration and to save storage space of a storage device (e.g., HDD).

Meanwhile, when recovering from a failure, the transaction system 5, under the control of the recovery processing unit 7, restores regular reports temporarily stored in the storage unit 66 of the device information management apparatus 6 into the DB servers 52 (step S27).

Steps S22 and S25 in FIG. 9 of determining whether to process or discard reports are described in more detail below. When the transaction system 5 fails, the device information management apparatus 6 calculates a value based on the importance level of a report received from the device management client 2 and the load level of the device information management apparatus 6 and determines to process the report if the calculated value is equal to or greater than a predetermined processing threshold. For example, the device information management apparatus 6 may be configured to obtain the sum of the importance level of a report and the load level of the device information management apparatus 6. In this case, assuming that the processing threshold is 5, a report is processed if the importance level is 3 and the load level is 4 or if the importance level is 3 and the load level is 2. If the importance level is 3 and the load level is 1, the report is not processed.

In the above embodiment, whether to process a report is determined based on both the importance level of a report and the load level of the device information management apparatus 6. Alternatively, whether to process a report may be determined based only on the importance level of a report or the load level of the device information management apparatus 6.

Figure 10:
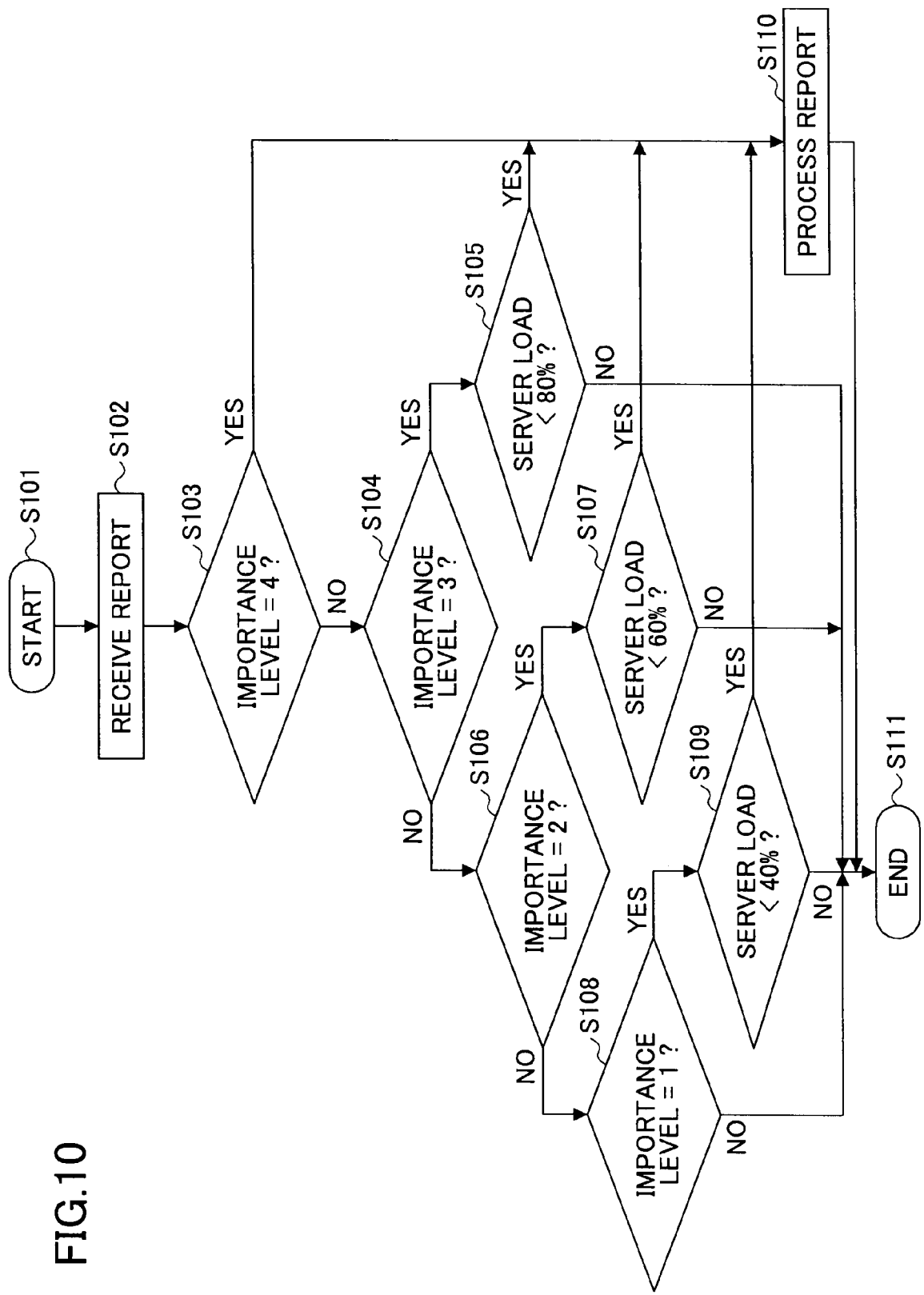
FIG. 10 is a flowchart showing an exemplary process of determining whether to process a report based on an importance level and a load level.

Also, whether to process a report may be determined based primarily on the importance level as shown in FIG. 10. FIG. 10 is a flowchart showing an exemplary process of determining whether to process a report in steps S22 and S25 of FIG. 9 based on the importance level and the load level. In FIG. 10, the determining process is started in step S101. When a report is received (step S102), it is determined whether the importance level of the report is 4 (step S103). If the importance level is 4 (YES in step S103), the report is processed (step S110) and the determining process is terminated (step S111).

If the importance level is not 4 (NO in step S103), it is then determined whether the importance level is 3 (step S104). If the importance level is 3 (YES in step S104), it is then determined whether the load of the device information management apparatus 6 (hereafter called the server load) is less than 80% (step S105). If the server load is less than 80% (YES in step S105), the report is processed (step S110) and the determining process is terminated (step S111). If the server load is not less than 80% (NO in step S105), the determining process is terminated without processing the report (step S111).

If the importance level is not 3 (NO in step S104), it is then determined whether the importance level is 2 (step S106). If the importance level is 2 (YES in step S106), it is then determined whether the server load is less than 60% (step S107). If the server load is less than 60% (YES in step S107), the report is processed (step S110) and the determining process is terminated (step S111). If the server load is not less than 60% (NO in step S107), the determining process is terminated without processing the report (step S111).

If the importance level is not 2 (NO in step S106), it is then determined whether the importance level is 1 (step S108). If the importance level is 1 (YES in step S108), it is then determined whether the server load is less than 40% (step S109). If the server load is less than 40% (YES in step S109), the report is processed (step S110) and the determining process is terminated (step S111). If the server load is not less than 40% (NO in step S109), the determining process is terminated without processing the report (step S111).

If the importance level is not 1 (NO in step S108), the determining process is terminated without processing the report (step S111).

Figure 11:
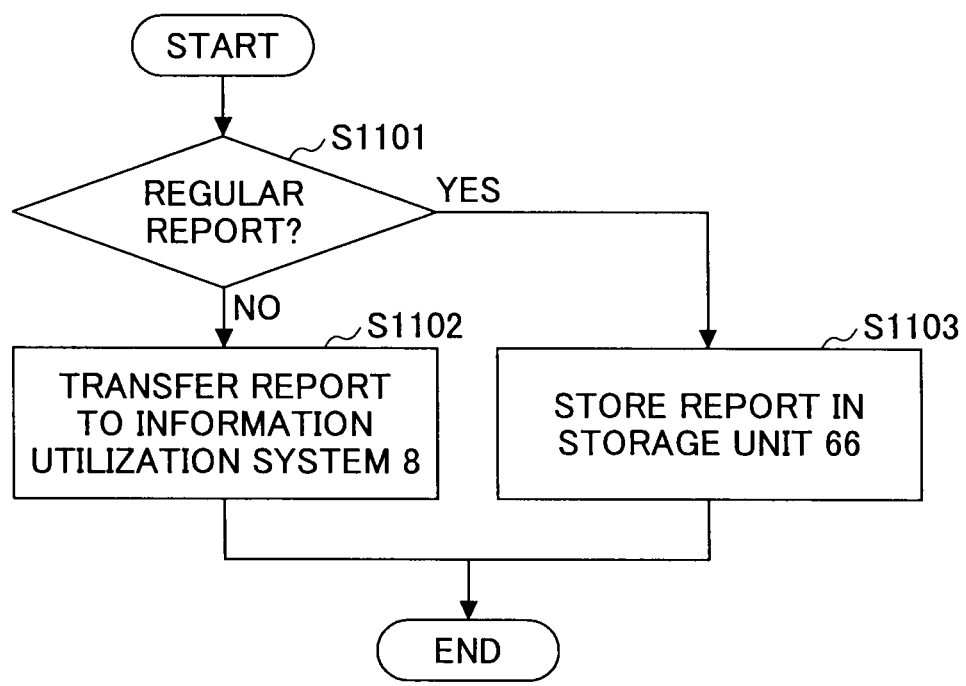
FIG. 11 is a flowchart showing exemplary report processing.

FIG. 11 shows exemplary report processing in step S110 of FIG. 10. If the report is a regular report (YES in step S1101), it is stored in the storage unit 66 (step S1103). If the report is an irregular report (NO in step S1101), it is transferred to the information utilization system 8. As described above, regular reports stored in the storage unit 66 are restored by the recovery processing unit 7 to the DB servers 52 during a recovery process of the transaction system 5. On the other hand, irregular reports transferred to the information utilization system 8 can be referenced by the user terminal 9.

<Summary>

As described above, embodiments of the present invention provide at least the following features:

(1) A device information management apparatus of the above embodiments makes it possible to discard reports that are not important and/or urgent and thereby to continue only important operations performed by application servers and DB servers of a transaction system.

(2) The device information management apparatus makes it possible to store reports in a storage unit in a format other than a database format and thereby to save storage space.

(3) The device information management apparatus makes it possible to restore reports temporarily stored in a storage unit to DB servers of the transaction system during a recovery process (or after recovery) from a system failure.

The above features in turn make it possible to use a low-performance apparatus as the device information management apparatus.

Embodiments of the present invention provide a device information management apparatus that makes it possible to use a small-scale backup device for data recovery.

An embodiment of the present invention provides a device information management apparatus for processing reports during a system failure. The device information management apparatus processes only reports of high importance when its load is high and processes even reports of low importance when its load is low. This configuration makes it possible to continue operations normally performed by a primary server when it fails by using a backup server smaller than the primary server.

The present invention is not limited to the specifically disclosed embodiments, and variations and modifications may be made without departing from the scope of the present invention.

The present application is based on Japanese Priority Application No. 2007-238269 filed on Sep. 13, 2007, and Japanese Priority Application No. 2008-173661 filed on Jul. 2, 2008, the entire contents of which are hereby incorporated herein by reference.

What is claimed is:

1. A device information management apparatus for processing a report from a device management client, comprising:
    a reception unit configured to receive the report from the device management client during a failure of a transaction system;
    a determining unit configured to determine whether to process the report based on an importance level of the report and a load level of the device information management apparatus;
    a processing unit configured to process the report if the determining unit determines to process the report; and
    a discarding unit configured to discard the report if the determining unit determines not to process the report;
    wherein the processing unit is configured to store the report in a storage unit if the report is a regular report and to transfer the report to an information utilization system if the report is an irregular report,
    wherein the determining unit is configured to determine to process the report if the sum of the importance level and the load level is equal to or greater than a predetermined threshold and to determine not to process the report if the sum of the importance level and the load level is less than the predetermined threshold.

2. The device information management apparatus as claimed in claim 1, wherein the processing unit is configured to store the regular report in a text format in the storage unit.

3. The device information management apparatus as claimed in claim 2, further comprising:
    a recovery processing unit configured to restore the regular report stored in the text format in the storage unit into the transaction system during a recovery process from the failure of the transaction system.

4. The device information management apparatus as claimed in claim 3, wherein the recovery processing unit uses a backup device for data recovery.

5. The device information management apparatus as claimed in claim 1, wherein the determining unit is configured to determine the importance level based on a list where service types of reports are associated with importance levels.

6. The device information management apparatus as claimed in claim 1, wherein the discarding unit discards reports that have at least one of an importance level below a first predetermined threshold and an urgency level below a second predetermined threshold.

7. The device information management apparatus as claimed in claim 1, wherein the processing unit processes only reports having an importance level above a first predetermined threshold when the load level of the device information management apparatus is above a second predetermined threshold and processes both reports having an importance level above the first predetermined threshold and reports having an importance level below the first predetermined threshold when the load level of the device information management apparatus is below the second predetermined threshold.

8. The device information management apparatus as claimed in claim 1, wherein the regular report reports information on a regular basis, and the irregular report reports information regarding an event each time the event occurs.

9. A method of processing a report from a device management client by a device information management apparatus during a failure of a transaction system, comprising the steps of:
    receiving the report from the device management client during the failure of the transaction system;
    determining whether to process the report based on an importance level of the report and a load level of the device information management apparatus;
    processing the report if it is determined to process the report;
    discarding the report if it is determined not to process the report;
    storing the report in a storage unit, when the report is a regular report; and
    transferring the report to an information utilization system, when the report is an irregular report,
    wherein the determining determines to process the report if the sum of the importance level and the load level is equal to or greater than a predetermined threshold and to determine not to process the report if the sum of the importance level and the load level is less than the predetermined threshold.

10. The method of claim 9, further comprising:
    restoring the report during a recovery process from the failure of the transaction system, when the report is a regular report.

11. The method of claim 9, further comprising:
    during a time when the transaction system is not failing, equally distributing reports to a plurality of application servers, by a load balancer;
    during a recovery process from the failure of the transaction system, distributing reports to the device information management apparatus, by a load balancer.

12. The method of claim 9, further comprising the steps of, performed during a time when the transaction system is functioning properly and in a non-failed mode, and performed by a plurality of application servers:
    managing information relating to a plurality of devices, and
    executing business logic to provide services,
    wherein the business logic further includes
    measuring usage using a counter.

13. The method of claim 9,
    wherein each report includes at least a service type including a service ID and a class identifier, a client ID for identifying a device management client, date and time indicating when the report was sent, and service-related data.

14. A non-transitory storage medium having program code embodied therein for causing a computer to perform a method of processing a report from a device management client during a failure of a transaction system, the method comprising the steps of:
    receiving the report from the device management client during the failure of the transaction system;
    determining whether to process the report based on an importance level of the report and a load level of the computer;

processing the report if it is determined to process the report;

discarding the report if it is determined not to process the report;

storing the report in a storage unit, when the report is a regular report; and transferring the report to an information utilization system, when the report is an irregular report, wherein the determining determines to process the report if the sum of the importance level and the load level is equal to or greater than a predetermined threshold and to determine not to process the report if the sum of the importance level and the load level is less than the predetermined threshold.

* * * * *